(12) United States Patent
Takehara

(10) Patent No.: US 12,504,637 B2
(45) Date of Patent: Dec. 23, 2025

(54) HEAD MOUNTED DISPLAY DEVICE WITH HYDROGEN SUPPLY FUNCTION

(71) Applicant: Aqua Bank CO., LTD., Osaka (JP)

(72) Inventor: Takashi Takehara, Osaka (JP)

(73) Assignee: Aqua Bank CO., LTD., Osaka (JP)

( * ) Notice: Subject to any disclaimer, the term of this patent is extended or adjusted under 35 U.S.C. 154(b) by 0 days.

(21) Appl. No.: 18/860,692

(22) PCT Filed: May 23, 2023

(86) PCT No.: PCT/JP2023/019155
§ 371 (c)(1),
(2) Date: Oct. 28, 2024

(87) PCT Pub. No.: WO2023/248685
PCT Pub. Date: Dec. 28, 2023

(65) Prior Publication Data
US 2025/0291196 A1   Sep. 18, 2025

(30) Foreign Application Priority Data
Jun. 23, 2022   (JP) ................. 2022-101007

(51) Int. Cl.
*G02B 27/01* (2006.01)
*A61M 35/00* (2006.01)

(52) U.S. Cl.
CPC ......... *G02B 27/0176* (2013.01); *A61M 35/10* (2019.05); *G02B 27/0172* (2013.01); *A61M 2202/0007* (2013.01); *A61M 2202/02* (2013.01); *A61M 2205/507* (2013.01); *A61M 2205/8206* (2013.01); *A61M 2210/0612* (2013.01); *G02B 2027/0178* (2013.01)

(58) Field of Classification Search
CPC ............ G02B 27/0176; G02B 27/0172; G02B 2027/0178; A61M 35/10; A61M 2202/0007; A61M 2202/02; A61M 2205/507; A61M 2205/8206; A61M 2210/0612
See application file for complete search history.

(56) References Cited

U.S. PATENT DOCUMENTS

| | | | |
|---|---|---|---|
| 11,815,692 B1* | 11/2023 | Pickett | G02B 27/0176 |
| 2017/0112667 A1* | 4/2017 | Fateh | A61B 5/1032 |
| 2017/0189230 A1 | 7/2017 | Fateh | |
| 2019/0201642 A1* | 7/2019 | Takehara | A61K 33/00 |

FOREIGN PATENT DOCUMENTS

| | | |
|---|---|---|
| JP | 2016130856 A | 7/2016 |
| JP | 2017183763 A | 10/2017 |
| JP | 6280295 B2 | 2/2018 |
| WO | 2017/122476 A1 | 7/2017 |
| WO | 2018/047889 A1 | 3/2018 |
| WO | 2018/151107 A1 | 8/2018 |
| WO | 2022/102513 A1 | 5/2022 |

\* cited by examiner

*Primary Examiner* — Sahlu Okebato
(74) *Attorney, Agent, or Firm* — NKL Law; Jae Youn Kim

(57) ABSTRACT

Provided is a head-mounted display apparatus with a hydrogen supply function to be mounted on the head of a user, which supplies air containing hydrogen to an interior of a display part capable of displaying at least a Virtual Reality (VR) video. The head-mounted display apparatus provided with the hydrogen supply function is mounted on the head of the user, and supplies the air containing hydrogen to the interior of the display part capable of displaying at least the Virtual Reality (VR) video.

2 Claims, 5 Drawing Sheets

HEAD MOUNTED DISPLAY DEVICE WITH HYDROGEN SUPPLY FUNCTION

TECHNICAL FIELD

The present invention relates to a head-mounted display apparatus provided with a hydrogen supply function, which secures a hydrogen supply amount sufficient to cause percutaneous absorption of hydrogen from a periphery of an eye, and obtains good physiological effects, while satisfying functions as VR goggles such as fitting and visual fields of a user.

BACKGROUND ART

In recent years, Virtual Reality (VR), which is a technique of simulating the whole environment and enabling feeling of a space or a world created with a computer, has been attracting attention (Patent Literatures 1 to 2). The Virtual Reality (VR) enables an experience as if entering a virtual space by wearing a device (hereinafter, also referred to as the "VR device") mainly called a headset, a head-mounted display (HMD), or VR goggles. Practical use of the virtual reality is spreading over education/training and business beyond popularization in games/entertainment, and a living style in which the VR device is "habitually used" is expected to accelerate in the near future.

Meanwhile, risks of visual degradation, mental disorder, etc., due to excessive "habitual use" of the VR device are also pointed out, and thus improvement measures for health disorder due to the habitual use should also be examined.

Next, intake of hydrogen, which has been recently remarkably attracting attention for its effectiveness on human bodies, will be described. Hydrogen has utility in removing only bad active oxygen (=hydroxyl radical), which is the cause of various diseases, etc., from the body, and since hydrogen does not affect the tissues or cells of the body, there is a wide range of methods to take hydrogen inside the body. In particular, the inventor and the Applicant have provided various results of clinical trials focusing on the effect of intake of air containing high-concentration hydrogen on the body and mind, and have also regularly provided an apparatus allowing intake of gas containing high-concentration hydrogen (Patent Literatures 3 to 5). As one of such hydrogen intake apparatuses provided by the inventor and the Applicant, a method of promoting orbicularis oculi blood flow by causing percutaneous absorption of hydrogen from a periphery of an eye, a method of promoting other physiological effects, and a configuration of a hydrogen supplying goggle apparatus optimal for carrying out these methods are provided (see Japanese Patent Application No. 2022-074866 (hereinafter, also referred to as "Reference Literature 1")).

Physiological effects caused by supply of hydrogen to a periphery of an eye using hydrogen supplying goggles requires securement of time to "habitually use" the goggles, and how to provide a user with an incentive to wear the goggles is important. Accordingly, the inventor and the Applicant reached an idea that giving a function as hydrogen supplying goggles to the aforementioned VR goggles, for which "habitual use" is expected to accelerate, and using this as a hydrogen "habitual use" supply tool, is effective in terms of promoting physiological effects with hydrogen. Equipping a hydrogen intake function is rather desirable also for the VR goggles, as it can provide improvement measures for health disorder due to "habitual use" as mentioned above. That is to say, equipping the VR goggles with the hydrogen intake function is considered to be beneficial for solving promotion of "habitual use" of a user, which is the problem to be solved as the hydrogen supplying goggles, and improvement of health disorder, which is the problem to be solved as the VR goggles, at the same time, and there is a great significance in launching the development article into the society.

CITATION LIST

Patent Literature

Patent Literature 1: Japanese Patent No. 6280295
Patent Literature 2: Japanese Patent Laid-Open No. 2017-183763
Patent Literature 3: International Publication No. WO 2018/047889
Patent Literature 4: International Publication No. WO 2018/151107
Patent Literature 5: International Publication No. WO 2022/102513

SUMMARY OF INVENTION

Technical Problem

However, the hydrogen supplying goggles as shown in Patent Literature 5 or Reference Literature 1 are of a type in which hydrogen is supplied into a goggle main body by coupling an external hydrogen supplying apparatus, and an obstructive apparatus is separately attached to the VR goggles even in the case of a portable type. Thus, it is difficult to allow "habitual use" by the user, with the main use being VR goggles, by simply externally attaching an existing hydrogen supplying apparatus. In addition, even if a small hydrogen supplying apparatus is integrally mounted on the VR goggles, there is a need to secure a minimum release amount of hydrogen to obtain good physiological effects by the supply of hydrogen to a periphery of an eye. Meanwhile, in a headset of VR goggles, an eye cup assembly for allowing passage of a light from an electronic display to an eye of a user is an essential component, and since there is a demand to secure a constant distance and a space to achieve comfortable fitting and sufficient visual field of the user, there are design limitations based on this demand. Thus, designs of a hydrogen supplying apparatus and a hydrogen supply route within that limitations are needed.

The present invention has been made also in view of such circumstance, and its purpose is to provide a head-mounted display apparatus provided with a hydrogen supply function having a structure which can achieve, at the same time, improvement of health disorder problems, which is the problem to be solved of the VR goggles, by securing a hydrogen supply amount sufficient to cause percutaneous absorption of hydrogen from a periphery of an eye and obtain good physiological effects, and satisfaction of "habitual use property", which is the problem to be solved of the hydrogen supplying goggles, by satisfying functions as the VR goggles such as fitting and visual field of a user while providing the hydrogen supply function.

Solution to Problem

The present invention made to solve the above-described problem is a head-mounted display apparatus provided with a hydrogen supply function to be mounted on head of a user, which supplies air containing hydrogen to an interior of a display part capable of displaying at least a Virtual Reality (VR) video, wherein the display part includes:
- a pair of eye cup assemblies allowing passage of a light from an electronic display through a lens, and allowing passage to each eye of the user;
- a video control substrate mounted on a front of the eye cup assemblies, which supplies power to the electronic display and other electronic components for VR video display and performs control;
- a rechargeable battery which supplies power to the electronic components for VR video display;
- a casing which covers a periphery of the eye cup assemblies, the electronic components for VR video display, and the video control substrate to block an external light; and
- a front frame body mounted on a front of the casing, which covers a front of the eye cup assemblies, the electronic components for VR video display, and the video control substrate to block an external light, a hydrogen generating cartridge means of an electrolytic type for generating hydrogen is arranged in a side part on one side of the front frame body in a manner allowing insertion/extraction in an up-and-down direction, while a hydrogen generating substrate which is electrically connected with the hydrogen generating cartridge means and the rechargeable battery to supply power to the hydrogen generating cartridge and perform control is arranged in a side part on another side, and hydrogen generated in the hydrogen generating cartridge passes through a bottom part from the side part inside the front frame body, flows in flow paths formed with a dedicated pipe branched rearward on an underside of each of the eye cup assemblies and extended in parallel, and is released in a direction where each lower eyelid part of the user is positioned inside the casing.

According to the head-mounted display apparatus provided with the hydrogen supply function of the present invention, by giving the hydrogen supply function to the head-mounted display apparatus as the VR apparatus, it is possible to provide a role of reducing visual impairment due to long-time use of the VR apparatus, and a role of achieving securement of time to promote physiological effects such as increase of orbicularis oculi blood flow caused by supply of hydrogen to the periphery of the eye of the user using the VR apparatus, which is originally easy to wear for long hours, at the same time.

In particular, in the head-mounted display apparatus provided with the hydrogen supply function, the hydrogen generating apparatus of the electrolytic type, which is a cartridge type that can be inserted/extracted and easy to use, is arranged in a side part of a frame body at the front of the display part, and its control substrate (the control substrate for generating hydrogen) is arranged in a side part on the opposite side. Furthermore, by sharing the rechargeable battery performing power supply to the VR apparatus and other electronic components, a weight balance in front, back, left, and right can be maintained, and use without discomfort of the user is enabled as compared to an ordinary head-mounted display apparatus. In addition, also regarding the flow paths of hydrogen generated with the hydrogen generating cartridge, since dedicated pipes inside the front frame body are used and a path is set from the side part to the bottom part, space saving (consequently contributing to downsizing and improvement of the weight balance) can be achieved, while safety can be improved by isolating hydrogen from the electronic components having a possibility of heat generation. In this manner, even a small hydrogen generating cartridge can achieve increase of hydrogen amounts (securement of a hydrogen supply amount sufficient to obtain physiological effects such as increase of orbicularis oculi blood flow).

Moreover, in the head-mounted display apparatus provided with the hydrogen supply function, a space is secured in the bottom part inside the casing by adopting the type of a pair of eye cup assemblies supplying a VR video to each eye, and since the above-described dedicated pipes for hydrogen are arranged in parallel in the front-back direction in that space, and an outlet can be directed to each lower eyelid part of the user, hydrogen can be directly supplied to a lower eyelid part where physiological effects become particularly large. Moreover, hydrogen (gas mixed with the atmosphere) filled in the entire casing can also be supplied to other regions.

In addition, it is preferable that the hydrogen generating cartridge means includes an electrolytic cell capable of storing electrolyzed water, a pair of positive and negative electrodes of a plate shape, which oppose each other and stand from a lower side to an upper side inside the electrolytic cell, and a lid member opened toward a lower side, having a pipe to guide hydrogen generated in the negative electrode inside the electrolytic cell to the flow paths inside the front frame body,

- the electrolytic cell has a shape that is long up and down, and communication and blocking of the electrolyzed water inside and generated hydrogen is allowed on an upside,
- the lid member is mounted by being detachably placed over the upper side of the electrolytic cell, the lid member projecting to a central side in a width direction of the front frame body at the time of mounting,
- a receiving space for the hydrogen generating cartridge means, which is formed with a space into which the electrolytic cell is insertable in an up-and-down direction from an upper side and a space into which the lid member is fittable and insertable from the upper side, is provided on the one side of the front frame body,
- a plug terminal which electrically connects to a terminal projecting to an outside of the electrolytic cell from a lower end of the positive and negative electrodes in a bottom part at the time of insertion of the hydrogen generating cartridge means, and causes electrical conduction with the hydrogen generating substrate, is arranged in the receiving space, and
- an outer surface of the lid member forms a flat surface continuous with an outer surface of the front frame body at the time of the insertion of the hydrogen generating cartridge means.

According to the above-described head-mounted display apparatus provided with the hydrogen supply function, the electrolytic cell has a vertically long shape that is long in the up-and-down direction, and by causing the electrodes to internally contact along this, a maximum amount of generated hydrogen is obtained in the side part of the front frame body while saving the space, and electrolyzed water is unlikely to leak due to action of the user. Furthermore, generated hydrogen having a small specific weight can be naturally and efficiently collected with the lid member on the upside. Meanwhile, hydrogen collected on the upside does not directly leak to the outside, and a dedicated pipe to guide hydrogen from the electrolytic cell to the pipes inside the front frame body is provided inside the lid member. In addition, the lid member is mounted on the upside of the electrolytic cell while being projected to the central side from the electrolytic cell, and that projected part is received by the front frame body so as to be continuous with the surface of the front frame body at the time of insertion, thereby eliminating decorative strangeness in shapes as compared to an ordinary head-mounted display apparatus. That is to say, the lid member can assist enabling certain supply of hydrogen to the periphery of the eye, while saving space, and it also has a role of securing decorativeness as a head-mounted display apparatus.

Advantageous Effects of Invention

With the head-mounted display apparatus provided with the hydrogen supply function of the present invention, health disorder, which is the problem to be solved of the VR goggles, can be improved by providing a function as hydrogen supplying goggles achieving a supply method/a supply amount/a supply frequency of hydrogen-containing gas giving a sufficient effect to eye trouble and eyesight. At the same time, according to the structure of the head-mounted display apparatus provided with the hydrogen supply function, it is possible to satisfy functions as VR goggles such as securement of a safe hydrogen supply flow path, a weight balance, and visual field.

DESCRIPTION OF EMBODIMENTS

Figure 1:
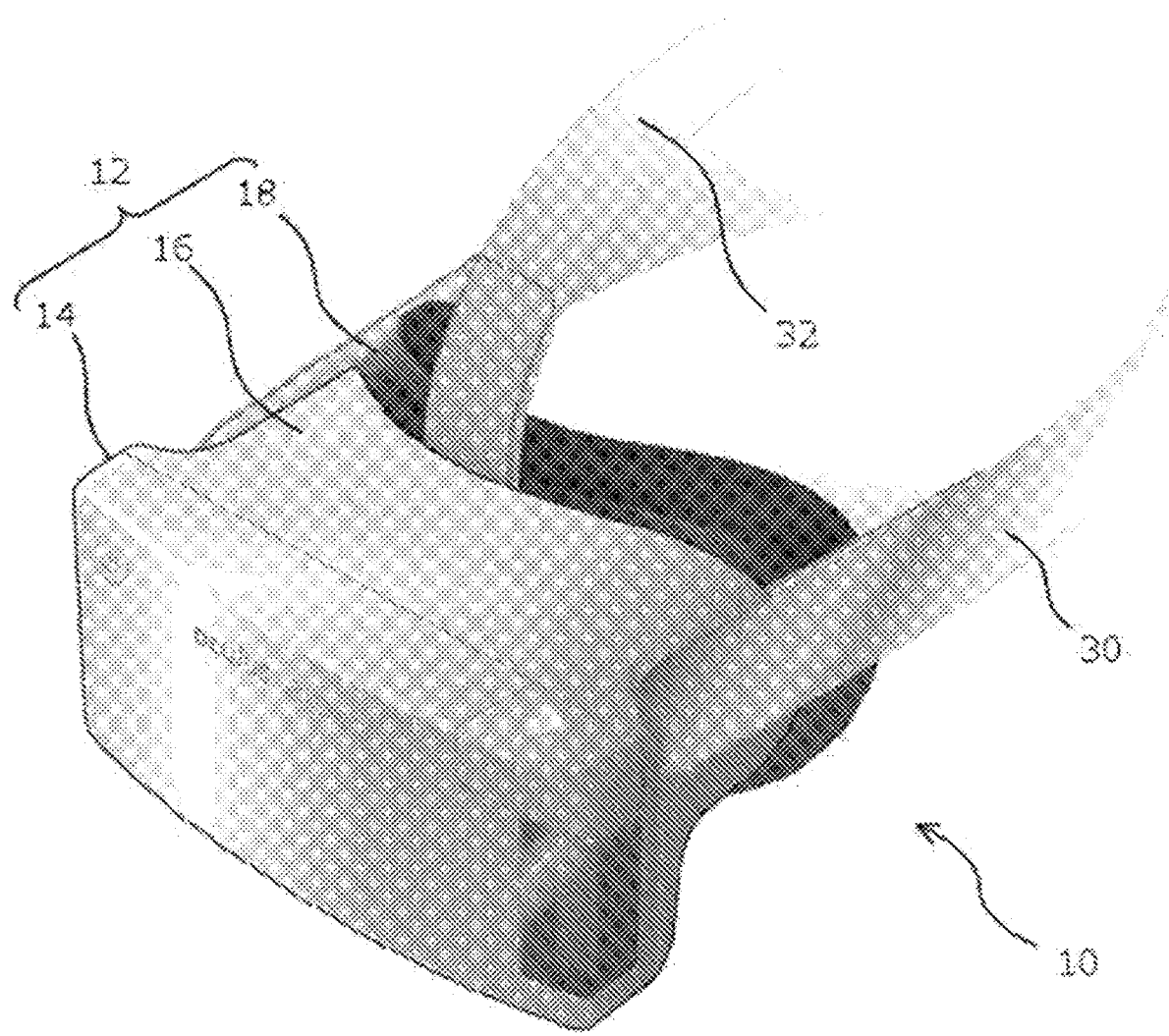
FIG. 1 is a perspective view of a head-mounted display apparatus provided with a hydrogen supply function, which is an embodiment of the present invention, seen from the upper right front.
Figure 2:
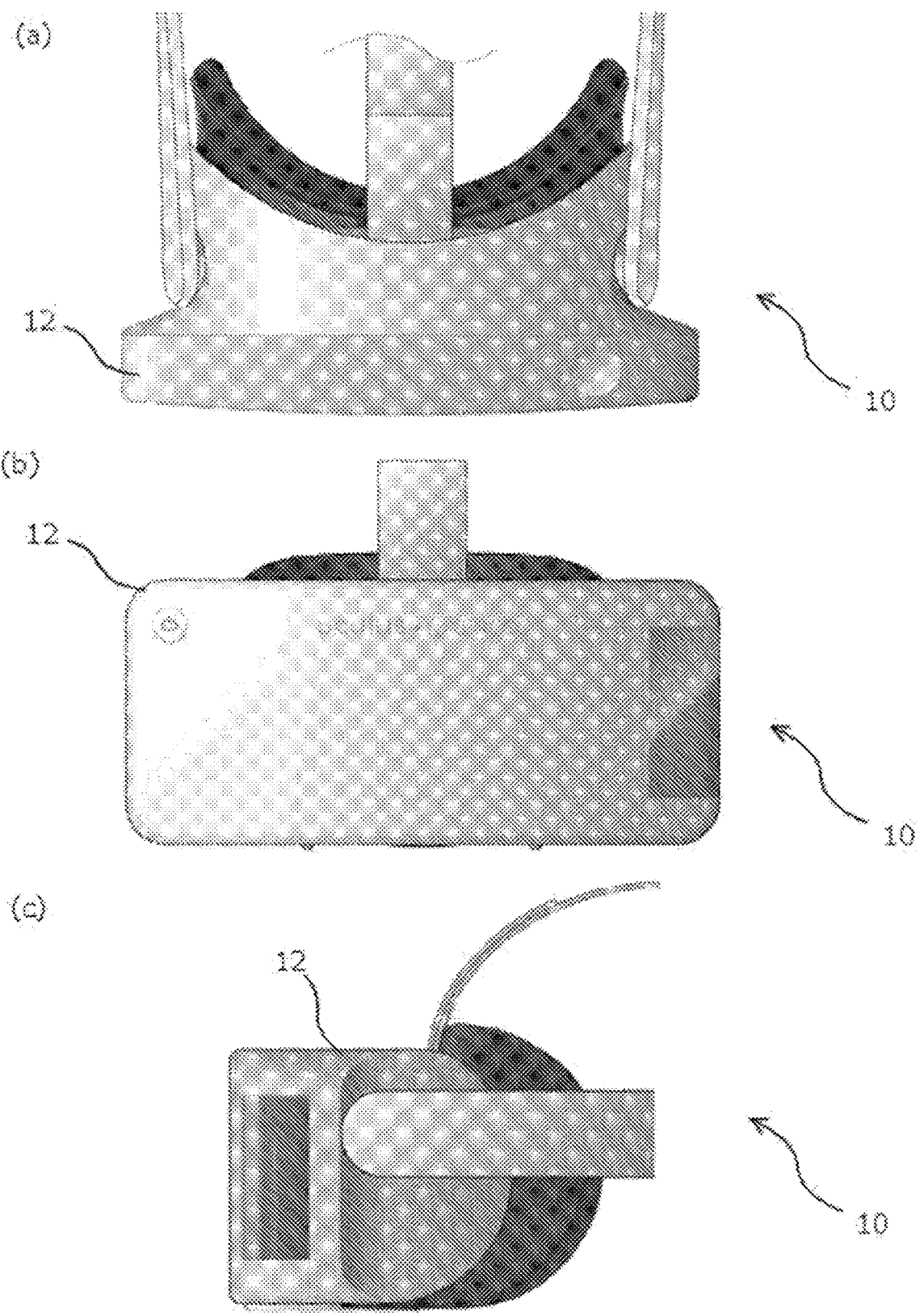
FIG. 2 is a diagram in which the head-mounted display apparatus provided with the hydrogen supply function in FIG. 1 is seen from each direction, (a) being a top view, (b) being a front view, and (c) being a right-side view.
Figure 3:
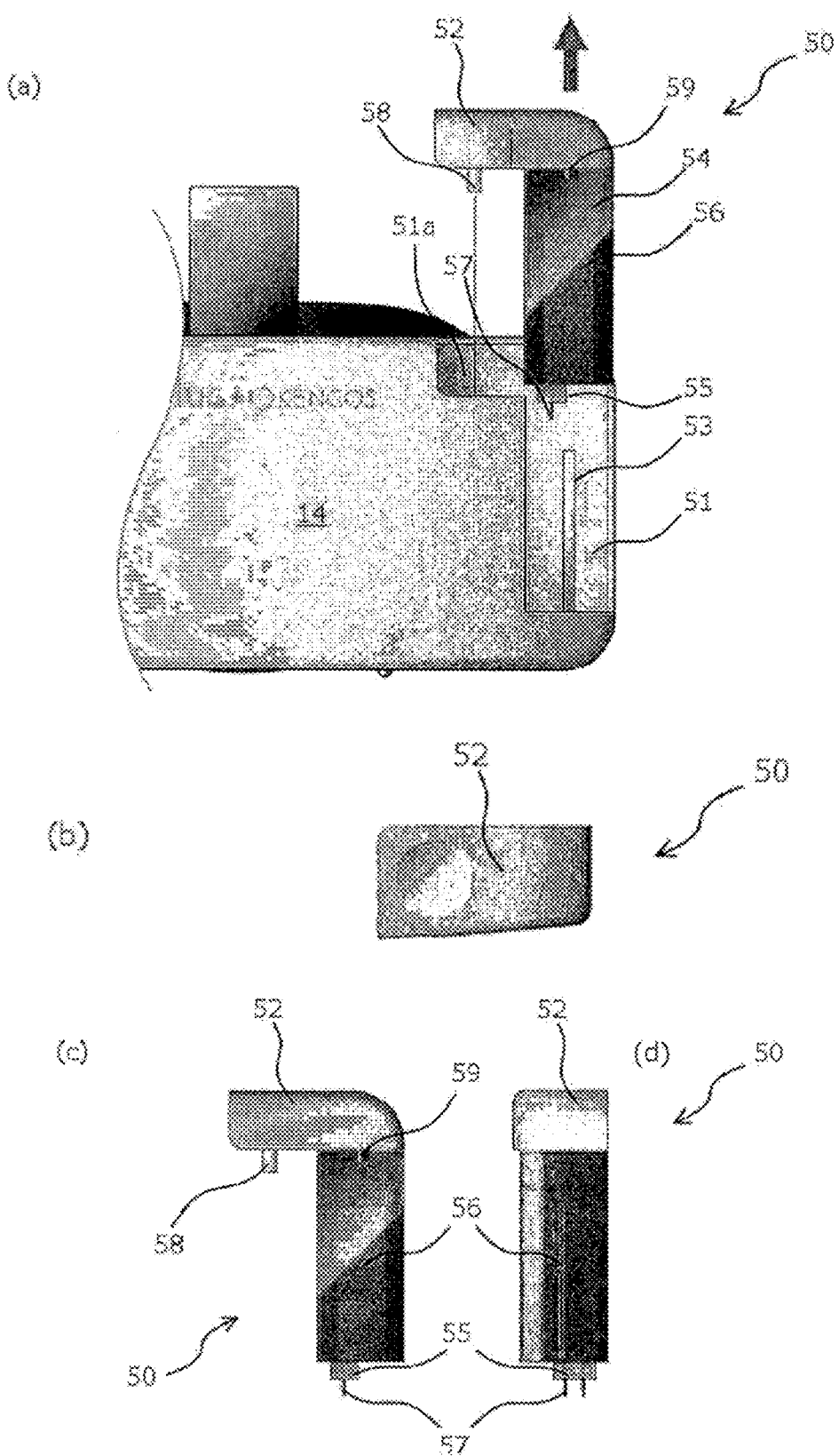
FIG. 3 is a diagram showing a hydrogen generating cartridge means of the head-mounted display apparatus provided with the hydrogen supply function in FIGS. 1 to 2, (a) being the right side of the head-mounted display apparatus provided with the hydrogen supply function in front view illustrating a drawn-out state of a hydrogen generating cartridge, (b) being a top view of the hydrogen generating cartridge, (c) being a front view of the hydrogen generating cartridge, and (d) being a right-side view of the hydrogen generating cartridge.
Figure 4:
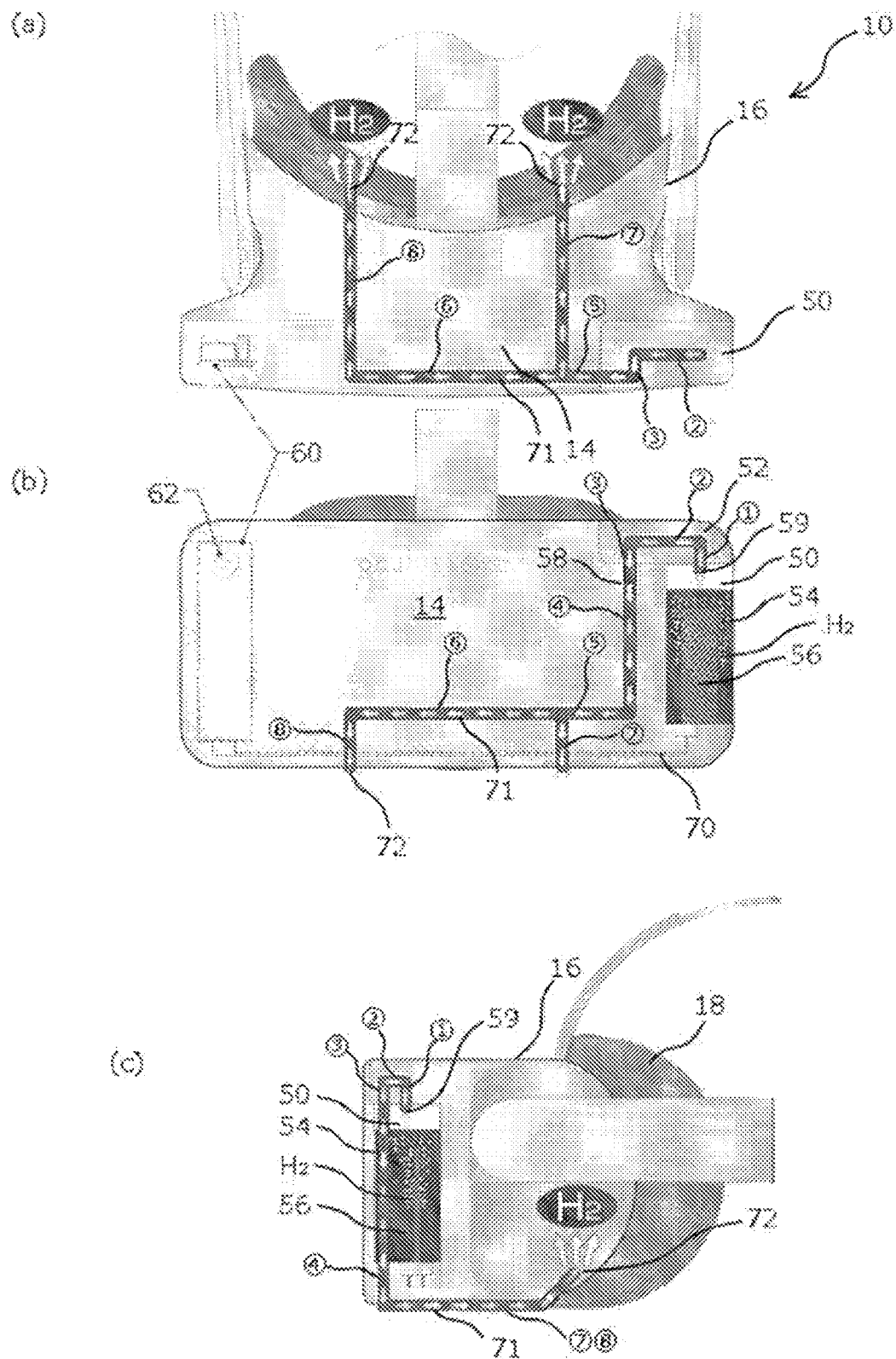
FIG. 4 shows a hydrogen propagating flow path from the hydrogen generating cartridge inside the head-mounted display apparatus provided with the hydrogen supply function in FIG. 1 to FIG. 3 to release to a periphery of an eye, (a) being a schematic view of the hydrogen propagating flow path seen from the top side of the head-mounted display apparatus provided with the hydrogen supply function, (b) being a schematic view of the hydrogen propagating flow path seen from the front side of the head-mounted display apparatus provided with the hydrogen supply function, and (c) being a schematic view of the hydrogen propagating flow path seen from the right side of the head-mounted display apparatus provided with the hydrogen supply function.
Figure 5:
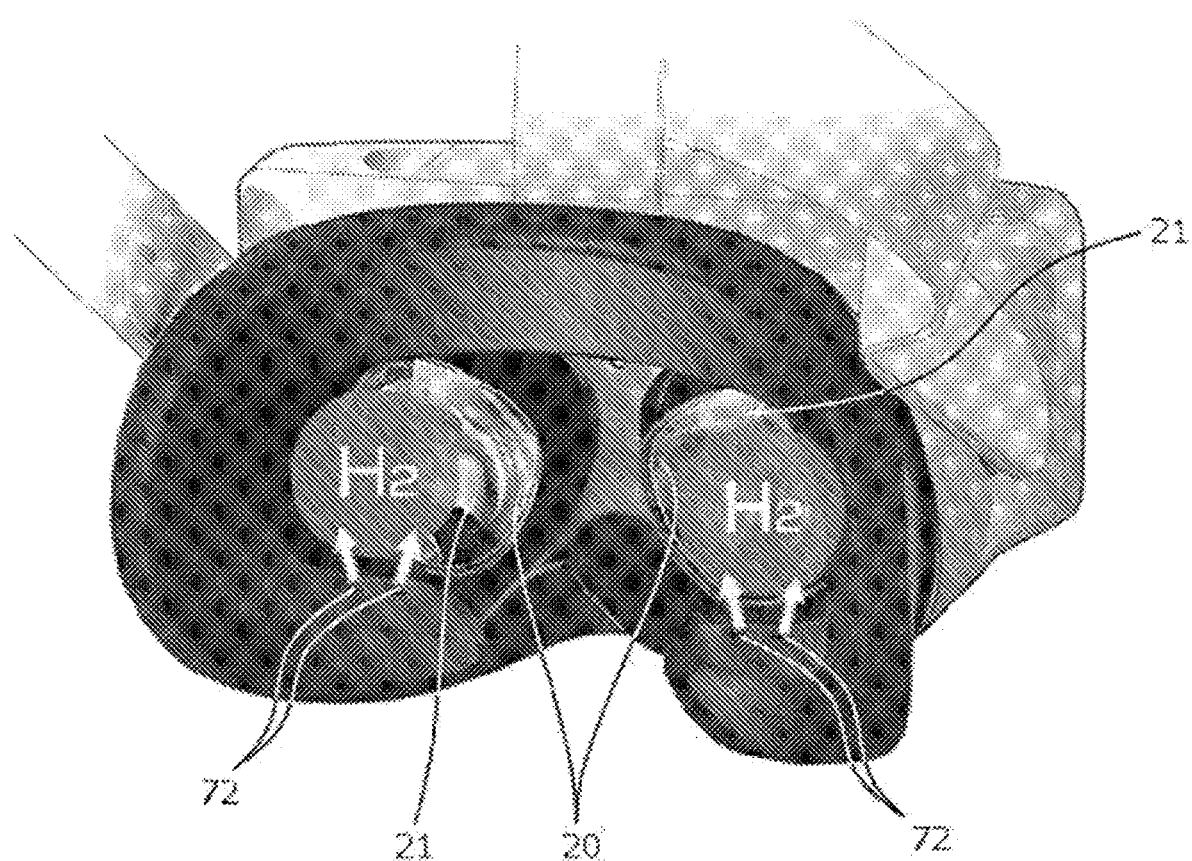
FIG. 5 is a perspective view of the head-mounted display apparatus provided with the hydrogen supply function in FIG. 1 to FIG. 4 seen from the upper rear side, and it shows a behavior of the release of hydrogen to the periphery of the eye.

FIG. 1 is a perspective view of a head-mounted display apparatus provided with a hydrogen supply function 10, which is an embodiment of the present invention, seen from the upper right front. FIG. 2 is a diagram in which the head-mounted display apparatus provided with the hydrogen supply function 10 is seen from each direction, (a) being a top view, (b) being a front view, and (c) being a right-side view. FIG. 3 is a diagram showing a hydrogen generating cartridge means 50 to be equipped to the head-mounted display apparatus provided with the hydrogen supply function 10, (a) being the right side of the head-mounted display apparatus provided with the hydrogen supply function 10 in front view illustrating a drawn-out state of the hydrogen generating cartridge 50, (b) being a top view of the hydrogen generating cartridge 50, (c) being a front view of the hydrogen generating cartridge 50, and (d) being a right-side view of the hydrogen generating cartridge 50. FIG. 4 shows a hydrogen propagating flow path from the hydrogen generating cartridge 50 inside the head-mounted display apparatus provided with the hydrogen supply function 10 to release to a periphery of an eye, (a) being a schematic view of the hydrogen propagating flow path seen from the top side of the head-mounted display apparatus provided with the hydrogen supply function 10, (b) being a schematic view of the hydrogen propagating flow path seen from the front side of the head-mounted display apparatus provided with the hydrogen supply function 10, and (c) being a schematic view of the hydrogen propagating flow path seen from the right side of the head-mounted display apparatus provided with the hydrogen supply function 10. FIG. 5 is a perspective view of the head-mounted display apparatus provided with the hydrogen supply function 10 seen from the upper rear side, and it shows a behavior of the release of hydrogen to the periphery of the eye.

The head-mounted display apparatus provided with the hydrogen supply function 10 (hereinafter, also simply referred to as the "VR apparatus 10") according to an embodiment of the present invention is a composite virtual experience apparatus to be attached to the head of a user, which provides a Virtual Reality (VR) video (hereinafter, also simply referred to as the "VR video") to the user such that the user can have a spatial/temporal experience similar to the reality, while at the same time being capable of measuring biological data of the user to sense physical, cognitive, and emotional changes of the user in progress of the virtual experience. The head-mounted display apparatus provided with the hydrogen supply function 10 includes a display part 12 as a main body.

The display part 12 is formed to have a structure allowing the user to wear this on his/her forehead, and its back side (rear side: the observing point of FIG. 5) is placed opposingly to the periphery of the eye of the user such that the user can confirm the virtual reality video during the wearing by the user. In this regard, some VR apparatuses have a structure in which an interior of the frontal side (front side) of the display part 12 integrally contains an electronic display (hereinafter, also referred to as the "liquid crystal panel") providing a VR video, and the VR video is provided to the user through a lens apparatus provided on the rear side. Meanwhile, the VR apparatus 10 adopts a model which secures a space for storing a hydrogen supply flow path, which will be described later, and the hydrogen generating cartridge, and further provides a pair of eye cup assemblies 20 (see FIG. 5), in which small liquid crystal panels are mounted one each for a lens corresponding to each eye to reduce power consumption and secure power for generating hydrogen.

This each eye cup assembly 20 is configured to receive an image light from a liquid crystal panel provided on the front side not shown, and direct this image light to a lens 21. The lens 21 directs the image light to the corresponding eyes of the user wearing the VR apparatus 10. In addition, the eye cup assemblies 20 are provided with a mechanical/electrical adjusting mechanism (not shown) capable of adjusting an interval between its position and the eyes of the user. The mechanical/electrical adjusting mechanism can perform adjustment in accordance with the presence or absence of glasses, whether the eyes have age-related longsightedness, etc., and the adjustment mechanism can adjust a center interval distance between the eye cup assemblies 20 to match with an interpupillary distance of the user. In this manner, focusing adjustment in accordance with characteristics of various users is enabled.

Although detailed descriptions are omitted, the lens 21 here means an optical element allowing the VR video from the liquid crystal panel to reach the eyes of the user for visual recognition of a stereoscopic video. The lens 21 includes, for example, a diaphragm, a Fresnel lens, a convex lens, a concave lens, a filter, one or a plurality of any other appropriate optical elements giving an influence on the image light, or a combination thereof, and an antireflection coating, etc., are also included.

Moreover, each eye cup assembly 20 forms a VR apparatus main body while being mounted on a front frame body 14 having a goggle shape on its frontal side (front side), and a video control substrate (mother board: not shown) for supplying power to the liquid crystal panel, and the like, and performing control is interposed/arranged along a width direction of the front frame body 14 in a gap between its front (frontal) inner wall and the eye cup assemblies 20. This VR apparatus main body is inserted and mounted, from the front side, into a casing 16 which is opened to the rear side (user side) while covering the periphery. In this manner, entering of an external light from a side periphery of the VR apparatus main body including the eye cup assemblies 20 is blocked, and entering of an external light from the front side is blocked with the front frame body 14, thereby allowing only the VR video from the eye cup assemblies 20 to be spread over the entire field of view of the user. Note that the above-described video control substrate may also have a function as a control substrate supplying power to the hydrogen generating cartridge 50, which will be described later, and performing control.

In addition, although detailed illustrations or descriptions are not given, the casing 16 and the front frame body 14 are equipped with various apparatuses relating to VR video creation such as a locator (a light source of a type in contrast to an environment in which an LED, a corner cube reflector, a reflective marker, etc., operate) placed at a specific position related to a specific reference point of the display part 12 in the head-mounted display apparatus provided with the hydrogen supply function 10, and an Inertial Measurement Unit (IMU) which is an electronic apparatus for creating fast calibration data indicating an estimated position of the display part 12 related to an initial position of the display part 12 based on a measurement signal received from one or a plurality of position sensors.

Next, a hydrogen supply means and a supply flow path 71 of hydrogen will be described.

As described above, each eye cup assembly 20 is mounted on the front frame body 14 with the video control substrate (not shown) being interposed into its front, but since the position of the eye cup assemblies 20, the video control substrate inside the front frame body 14, and video related equipment such as the above-described locator and the position sensor are arranged on the upper side from near the center, it is relatively easy to provide a space in a side part or a bottom part of the front frame body 14. In addition, as can be understood from the presence of a head band 32 for the top of the head and a head band 30 for the side of the head, when considering fitting to the user and technical precision in VR video creation such as a reference point and an estimated position, since there is a need to prevent dropping to the downward direction by own weight or rotation around the head, and allow firm positioning on the head, the VR apparatus also needs to take into consideration a weight balance due to the hydrogen supply means. Moreover, as provided in aforementioned Reference Literature 1, which is not disclosed at the time of filing of the present patent application, it has been discovered that hydrogen supply to an eye requires supply of hydrogen to a periphery of the eye, particularly a lower eyelid part, when promotion of its physiological effects is intended.

From such viewpoint, the head-mounted display apparatus provided with the hydrogen supply function 10 adopts the following configuration for the hydrogen supply means as the most preferred embodiment. Specifically, the head-mounted display apparatus provided with the hydrogen supply function 10 is generally constituted of the hydrogen generating cartridge means 50, a hydrogen generating substrate 60, and the flow path 71 for supplying hydrogen.

Firstly, the hydrogen generating cartridge means 50 will be described.

As shown in FIG. 3 to FIG. 4, the hydrogen generating cartridge means 50 is detachably inserted, in the longitudinal direction, into a receiving space 51 of one side part (in the illustrated example, the right side in front view (the left-hand side of the user)) of the front frame body 14. Specifically, with an electrolytic cell 54 and a lid member 52 arranged on its upside being mounted on the hydrogen generating cartridge means 50, insertion into the receiving space 51 from the electrolytic cell 54 side allows the lid member 52 to be formed as a part of a corner of the front frame body 14. The electrolytic cell 54 is a container in which electrolyzed water can be filled in its interior, and water can be injected (not shown) from its upper side in a removed state of the lid member 52. A pair of positive and negative electrodes 56, which are plate members of a mesh structure, are arranged in the interior of the electrolytic cell 54. The upper edge of the electrode 56 extends inside the electrolytic cell 54 to below a waterline (a recommended filling height of electrolyzed water) for sufficient soaking in the electrolyzed water, while the lower end is inserted/fixed into a tubular terminal block 55 mounted outside a bottom part of the electrolytic cell 54 to be electrically connected with a pair of plug terminals 57.

In addition, although not shown, a bottom part inside the receiving space 51 is provided with a tubular recessed part for receiving/fitting the terminal block 55, and an attachment to become a counterbore of the terminal block 55 and allowing electrical connection with insertion of the plug terminals is arranged in a bottom part of the recessed part. The electrolytic cell 54 is structurally assembled with the front frame body 14 by being inserted into the receiving space 51, and the electrode 56 is electrically connected with electrical equipment (in particular, the hydrogen generating substrate 60, which will be described later) inside the front frame body 14. Note that a recessed part (not shown) is provided upwardly in the longitudinal direction from the bottom part side of the electrolytic cell 54 to reinforce positioning and fixity of the electrolytic cell 54 inside the receiving space 51, and a projected part 53 inserted into that recessed part at the time of insertion stands upwardly from the bottom part of the receiving space 51.

A part of the lid member 52 in its traverse direction is mounted on the upside of the electrolytic cell 54 by fitting of recessed-projected parts not shown, while the remaining is projected in the traverse direction, thereby forming the hydrogen generating cartridge means 50 together with the electrolytic cell 54. The lid member 52 is long in the traverse direction, and while being mounted on the electrolytic cell 54, the hydrogen generating cartridge means 50 forms a L-shape rotated 90° in a counterclockwise manner, and is integrally inserted into the receiving space 51. Once the mounting in the receiving space 51 is completed, the top surface of the lid member 52 forms a surface (top surface) continuous with the top surface of the front frame body 14. Note that, when the hydrogen generating cartridge means 50 is inserted into the receiving space 51, a part projecting from the electrolytic cell 54 of the lid member 52 is fitted into a lid receiving space 51a, which is provided on the upside of the receiving space 51 and extended to the central side, and its entirety is received.

Moreover, the hydrogen generating substrate 60 (displayed with a dotted-line in FIG. 4) is mounted in the interior of the another side part (the left side in front view in the examples of (b) of FIG. 2 and (b) of FIG. 4 (the right-hand side of the user)) of the hydrogen generating cartridge means 50 of the front frame body 14. The hydrogen generating substrate 60 is a substrate for controlling power supply to the hydrogen generating cartridge means 50, and this is arranged by having the up-and-down direction as its longitudinal direction in the interior of a side part on the opposite side of the hydrogen generating cartridge means 50, in consideration of the space inside the front frame body 14 and the weight balance mentioned above. In addition, the hydrogen generating substrate 60 is electrically connected with a rechargeable battery not shown for supplying power to the video control means (mother board) and the liquid crystal panel incorporated in the VR apparatus 10, and an electric wire (see reference numeral 70 in (b) of FIG. 4) extending in the traverse direction of a bottom part (the underside of the liquid crystal panel, and the like) inside the front frame body 14 and connecting with the electrode 56 from the pair of plug terminals 57. With this electric circuit, once a switch 62 provided in a front upper part of the left side of the front frame body 14 in front view (the right-hand side of the user) is pressed, power of the rechargeable battery is supplied to the electrode 56, and the electrolyzed water inside the electrolytic cell 54 is subjected to electrolysis, resulting in generation of hydrogen from the electrode 56 on the negative electrode-side.

Next, the supply flow path 71 of hydrogen released to the periphery of the eye of the user will be described while referring mainly to FIG. 4 and arrows in the figure.

Firstly, when the lid member 52 is mounted, hydrogen generated from the electrode 56 on the negative electrode-side inside the electrolytic cell 54 passes through flow paths (circled numbers 1 to 3) inside the lid member 52 from an inflow port 59 positioned on the upside of the electrolytic cell 54, and flows to a discharge port 58 (also see (a) of FIG. 3) positioned on the downside of the lid member 52 projecting from the electrolytic cell 54. The discharge port 58 is connected to a flow path (circled number 4) extending in the up-and-down direction on the front side of the front frame body 14 along near the hydrogen generating cartridge means 50 from an inflow port (not shown) provided in the lid receiving space 51a of the front frame body 14, and hydrogen flows downwardly, then flows in a flow path (circled number 5) extending in the traverse direction near the bottom part of the front frame body 14 to the central side.

The flow path (circled number 5) is branched into a flow path (circled number 6) still extending in the traverse direction near the bottom part of the front frame body 14, and a flow path (circled number 7) extending toward one (the left-eye side) eye cup assembly 20. Subsequently, the flow path (circled number 6) is bent and connected with a flow path (circled number 8) extending in the traverse direction near the bottom part of the front frame body 14 on the left side in front view (the right-hand side of the user) and extending in parallel with the flow path (circled number 7) toward the another (the right-eye side) eye cup assembly 20.

Each flow path (circled numbers 7 to 8) extending toward the eye cup assemblies 20 passes through a bottom part of the casing 16 from the front frame body 14, and reaches a discharge port 72 directed to a periphery of both eyes, especially lower eyelid parts, of the user. Hydrogen released from the discharge port 72 is sprayed to the lower eyelid parts of the user, and is mixed with the atmosphere inside the display part 12 for filling. Note that the discharge port 72 may reach a protector 18 at the rear of the casing 16 forming a part contacting the face of the user.

Note that, since hydrogen flows in the flow paths (circled numbers 1 to 8), the flow paths are formed with dedicated pipes separated from electronic components having a possibility of rise in temperature such as the hydrogen generating cartridge means 50, the liquid crystal panel, the video control means, the eye cup assemblies 20, the hydrogen generating substrate 60, and the rechargeable battery, and thus hydrogen reaches the periphery of the eye without directly touching the electronic components.

Next, verification results on promotion of physiological action caused by supply of hydrogen to a periphery of an eye, which is provided by the Applicant and the inventor in Reference Literature 1 mentioned above, will be generally described. Firstly, a verification test of promotion of orbicularis oculi blood flow conducted under conditions as shown below will be described.

Test participant: healthy women in her twenties or thirties (living in or near Tokyo, n=24)
    Sample to be examined: new-type hydrogen generating apparatus
    Contents to be examined: Analyses of action on autonomic nerve activities, action on central nerve activities, changes in hemodynamics, action on dynamic visions, action on emotions/feelings, etc.
    Usage: generating hydrogen of 50 cc/min from the new-type hydrogen generating apparatus, and guiding the generated hydrogen to dedicated eye goggles. Use for eight minutes (measure brain waves during use), then evaluate autonomic nerves, etc.
    Items to be investigated: central nerve activities (measurement of brain waves), dynamic vision measurement, emotions/feelings evaluation (many-sided emotion level questionnaires), peripheral circulatory functions (a two-dimensional contactless blood flowmeter), evaluation of brain activities/brain fatigue (measurement of flicker values), evaluation of brain stress/brain age (ATMT measurement), and quantification of salivary oxytocin (ELISA method).
    Apparatus for measuring amounts of change in blood flow: OMEGAZONE (manufactured by OMEGAWAVE, INC.)

Measuring region: inner corners of the eyes, lower eyelid parts, upper eyelid parts, outer corners of the eyes, and a forehead part (including a part between eyebrows).

Conventionally, absorption of high-concentration hydrogen from an eyeball and a periphery of the eye has been based on a hypothesis that hydrogen permeation into moisture of the surface of the eyeball has a particularly significant influence on physiological action such as brain functions, etc. However, as a result of conducting the verification under the above-described conditions, high concentration percutaneous absorption from the periphery of the eye has a statistical significance in promotion of orbicularis oculi blood flow, and a particularly remarkable significance is seen in the lower eyelid parts, while it is also demonstrated that the p value (a probability of a test statistic becoming that value on the basis of a null hypothesis in statistical hypothesis testing) is extremely small. From these points, it is discovered that percutaneous absorption of the high-concentration hydrogen from the periphery of the eye (in particular, direct supply of hydrogen to the lower eyelid parts) has a large influence on orbicularis oculi blood flow.

In addition, it is verified from a flicker measurement that percutaneous absorption of high-concentration hydrogen from the periphery of the eye is beneficial in reducing degrees of brain fatigue, and flicker values (frequency Hz) are significantly raised when causing percutaneous absorption of the high-concentration hydrogen from the periphery of the eye as compared to when causing percutaneous absorption of environmental air from the periphery of the eye, while the p value is also extremely small. Thus, it is found out that brain fatigue is reduced due to percutaneous absorption of the high-concentration hydrogen from the periphery of the eye.

In addition, an effect on enhancement of brain functions (age improvement) caused by percutaneous absorption of the high-concentration hydrogen from the periphery of the eye is also verified, and it is observed in Advanced Trail Making Test (ATMT: Laboratory of psychophysiology, Department of Psychiatry, Osaka University School of Medicine) that brain age is significantly lowered when causing percutaneous absorption of the high-concentration hydrogen from the periphery of the eye for eight minutes (hydrogen) as compared to when causing percutaneous absorption of the environmental air from the periphery of the eye. Thus, it is found out that brain functions are enhanced (age is improved) due to percutaneous absorption of the high-concentration hydrogen from the periphery of the eye.

In addition, activation of the cerebrum caused by percutaneous absorption of the high-concentration hydrogen from the periphery of the eye is also verified, and as a result of using BrainPro (Futek Electronics Co., Ltd.) as a brain wave measuring system, as compared to when causing percutaneous absorption of the environmental air from the periphery of the eye, $\alpha$ waves are significantly decreased and $\beta$ waves are significantly raised immediately after causing percutaneous absorption of the high-concentration hydrogen from the periphery of the eye (hydrogen). Thus, it is found out that the cerebrum is activated.

Moreover, a change in amounts of salivary oxytocin (happy hormones) secretion caused by percutaneous absorption of the high-concentration hydrogen from the periphery of the eye is also verified, and it is found out that amounts of change in oxytocin are significantly raised when causing percutaneous absorption of the high-concentration hydrogen from the periphery of the eye for eight minutes (hydrogen) as compared to when causing percutaneous absorption of the environmental air from the periphery of the eye, and positive emotions such as happiness, cheerfulness, and satisfaction are evoked due to percutaneous absorption of the high-concentration hydrogen from the periphery of the eye.

From the verification results as above, it is demonstrated that percutaneous absorption of hydrogen from the periphery of the eye allows increase in blood flow in the periphery of the eye, maintenance/improvement of dynamic visions, decrease in $\alpha$ waves, increase in $\alpha$ waves, reduction in brain fatigue, activation of brain functions, and increase in salivary oxytocin. With the configuration of the head-mounted display apparatus provided with the hydrogen supply function 10, which can supply high-concentration hydrogen especially to the lower eyelid parts and fill the high-concentration hydrogen also to the entire periphery of the eye, it is possible to allow "habitual use", while achieving promotion of orbicularis oculi blood flow, which is one of methods to improve visual degradation, reduction of brain fatigue, enhancement of brain functions (age improvement), and promotion of oxytocin secretion, which are the problems to be solved by the VR goggles.

Embodiments of the head-mounted display apparatus provided with the hydrogen supply function according to the present invention, and the verification results of supplying high-concentration hydrogen to the periphery of the eye have been exemplified and described above, but the present invention is not limited thereto, and it will be understood by those skilled in the art that other modifications and improvements can be made without departing from the spirit and the teaching described in the claims and the specification or the like.

REFERENCE SIGNS LIST 10 head-mounted display apparatus provided with the hydrogen supply function (VR apparatus)
12 display part
16 casing
18 protector
14 front frame body
20 eye cup assembly
21 lens
30 head band for the side of the head
32 head band for the top of the head
50 hydrogen generating cartridge means
51 receiving space
51a lid receiving space
52 lid member
53 projected part
54 electrolytic cell
55 terminal block
56 electrode
57 plug terminal (terminal)
58 discharge port
59 inflow port
60 hydrogen generating substrate
62 switch
70 electric wire
71 flow path
72 discharge port

The invention claimed is:

1. A head-mounted display apparatus provided with having a hydrogen supply function, configured to be mounted on a head of a user, which supplies and supply air containing hydrogen to an interior of a display part capable of for displaying at least a Virtual Reality (VR) video the head-mounted display apparatus comprising:

a pair of eye cup assemblies, each including a respective lens and configured to guide light from an electronic display to a respective eye of the user;

a video control substrate mounted on a front of the eye cup assemblies, configured to supply power to the electronic display and other electronic components for a VR video display and to control operation of the VR video display;

a rechargeable battery configured to supply power to the electronic components for the VR video display;

a casing configured to cover a periphery of the eye cup assemblies, the electronic components for the VR video display, and the video control substrate to block external light; and a front frame body mounted on a front of the casing, and configured to cover the front of the eye cup assemblies, the electronic components for the VR video display, and the video control substrate to block the external light, wherein a hydrogen generating cartridge means of an electrolytic type for generating hydrogen is arranged in a side part on one side of the front frame body in a manner allowing insertion/extraction and is configured to be inserted or extracted in an up-and-down direction, while and a hydrogen generating substrate, disposed in a side part on another side of the front frame body and electrically connected to the hydrogen generating cartridge and the rechargeable battery, is configured to supply power to, and control operation of, the hydrogen generating cartridge, wherein the hydrogen generated in the hydrogen generating cartridge passes from the side part on the one side of the front frame body to a bottom part inside the front frame body, flows through flow paths defined by a dedicated pipe branched rearward on an underside of each of the eye cup assemblies and extended in parallel, and is released in a direction where each lower configured to be discharged toward respective lower eyelid regions of the user inside the casing.

2. The head-mounted display apparatus according to claim 1, wherein the hydrogen generating cartridge further comprises:

an electrolytic cell configured to store electrolyzed water;

a pair of electrodes including a positive electrode and a negative electrode of a plate shape, which oppose each other and extend from a lower side to an upper side inside the electrolytic cell; and a lid member including a discharge port located at a lower side thereof, and having a pipe configured to guide the hydrogen generated at the negative electrode inside the electrolytic cell to the flow paths inside the front frame body, wherein the electrolytic cell has a vertically elongated shape, and is configured to allow or block at an upper side thereof communication of the electrolyzed water and the generated hydrogen, wherein the lid member is detachably mounted over the upper side of the electrolytic cell, and projects toward a central side in a width direction of the front frame body, wherein a receiving space for the hydrogen generating cartridge is disposed in the one side of the front frame body means, the receiving space including a vertical space into which the electrolytic cell is insertable from an upside the upper side and a space into which the lid member is fittable and insertable from the upper side, wherein a plug terminal disposed in the receiving space, electrically connectable to a terminal projecting to an outside of the electrolytic cell from a lower end of the electrodes in a bottom part at the time of insertion of the hydrogen generating cartridge, and electrically conductible with the hydrogen generating substrate, and wherein an outer surface of the lid member defines a flat surface continuous with an outer surface of the front frame body at the time of the insertion of the hydrogen generating cartridge.

* * * * *